US012767018B2

(12) United States Patent
Klie et al.

(10) Patent No.: US 12,767,018 B2
(45) Date of Patent: Oct. 20, 2026

(54) LEVER FOR A VEHICLE SEAT

(71) Applicant: BROSE FAHRZEUGTEILE SE & CO. KOMMANDITGESELLSCHAFT, COBURG, Coburg (DE)

(72) Inventors: Roman Klie, Coburg (DE); Jochen Hofmann, Marktgraitz (DE); Christoph Singer, Rödental (DE); Thomas Bittermann, Coburg (DE)

(73) Assignee: BROSE FAHRZEUGTEILE SE & CO. KOMMANDITGESELLSCHAFT, COBURG, Coburg (DE)

( * ) Notice: Subject to any disclaimer, the term of this patent is extended or adjusted under 35 U.S.C. 154(b) by 337 days.

(21) Appl. No.: 18/550,052

(22) PCT Filed: Mar. 11, 2022

(86) PCT No.: PCT/EP2022/056314
§ 371 (c)(1),
(2) Date: Sep. 11, 2023

(87) PCT Pub. No.: WO2022/194697
PCT Pub. Date: Sep. 22, 2022

(65) Prior Publication Data

US 2024/0149762 A1 May 9, 2024

(30) Foreign Application Priority Data

Mar. 16, 2021 (DE) ..................... 10 2021 202 560.9

(51) Int. Cl.
*B60N 2/16* (2006.01)
*B60N 2/42* (2006.01)
*B60N 2/427* (2006.01)

(52) U.S. Cl.
CPC ....... *B60N 2/42709* (2013.01); *B60N 2/1605* (2013.01); *B60N 2/4228* (2013.01)

(58) Field of Classification Search
CPC . B60N 2/1605; B60N 2/1615; B60N 2/42709
See application file for complete search history.

(56) References Cited

U.S. PATENT DOCUMENTS 3,059,966 A 10/1962 Spielman
6,406,092 B1 6/2002 Cordes et al.
(Continued)

FOREIGN PATENT DOCUMENTS

CN 102673431 A 9/2012
DE 19953758 C1 3/2001
(Continued)

OTHER PUBLICATIONS

ISA European Patent Office, International Search Report Issued in Application No. PCT/EP2022/056314, Jun. 23, 2022, WIPO, 5 pages.

*Primary Examiner* — Timothy J Brindley
(74) *Attorney, Agent, or Firm* — McCoy Russell LLP

(57) ABSTRACT

It is provided a lever for a vehicle seat, comprising two bearing portions for pivotally connecting the lever to a further component in each case; a carrier element via which forces can be transmitted between the bearing portions; a displacement element on which one of the bearing portions is provided; and an elongate guide portion which is blocked in an initial position by a deformation portion so that the displacement element is fixed relative to the carrier element, wherein the deformation portion can be deformed by the action of forces acting between the bearing portions such that the guide portion is released and the displacement element is displaceable relative to the carrier element.

19 Claims, 13 Drawing Sheets

(56) References Cited

U.S. PATENT DOCUMENTS

| | | | | |
|---|---|---|---|---|
| 10,315,541 | B2 * | 6/2019 | Kostin | B60N 2/16 |
| 2002/0060488 | A1 | 5/2002 | Delmas et al. | |
| 2004/0066073 | A1 | 4/2004 | Wagner et al. | |
| 2015/0042133 | A1 * | 2/2015 | Munemura | B60N 2/42745<br>297/452.18 |
| 2017/0259713 | A1 | 9/2017 | Kostin | |
| 2019/0248315 | A1 * | 8/2019 | Oesterle | B60N 2/10 |
| 2020/0198505 | A1 | 6/2020 | Schoenbach et al. | |
| 2025/0042315 | A1 * | 2/2025 | Horion | B60N 2/4228 |
| 2025/0115174 | A1 * | 4/2025 | Chen | B60N 2/4221 |
| 2025/0214492 | A1 * | 7/2025 | Carlsson | B60N 2/4221 |

FOREIGN PATENT DOCUMENTS

| | | | | |
|---|---|---|---|---|
| DE | 19859238 | B4 | 2/2007 | |
| DE | 202014104538 | U1 | 11/2014 | |
| DE | 102014013295 | A1 | 4/2015 | |
| DE | 102023124028 | A1 * | 3/2025 | B60N 2/42763 |
| EP | 1783007 | A1 * | 5/2007 | B60R 21/013 |
| EP | 1849648 | A1 | 10/2007 | |
| EP | 2179887 | B1 | 9/2015 | |
| EP | 3188928 | B1 | 1/2020 | |
| JP | H04356240 | A | 12/1992 | |
| JP | 2009220744 | A | 10/2009 | |
| JP | 2019123435 | A | 7/2019 | |
| WO | WO-2025132399 | A1 * | 6/2025 | B60N 2/02246 |

* cited by examiner

LEVER FOR A VEHICLE SEAT

CROSS REFERENCE TO RELATED APPLICATIONS

The present application is a U.S. National Phase of International Application No. PCT/EP2022/056314 entitled "LEVER FOR A VEHICLE SEAT," and filed on Mar. 11, 2022. International Application No. PCT/EP2022/056314 claims priority to German Patent Application No. 10 2021 202 560.9 filed on Mar. 16, 2021. The entire contents of each of the above-listed applications are hereby incorporated by reference for all purposes.

The proposed solution relates to a lever and a vehicle seat having such a lever.

Levers for vehicle seats are in particular used as part of a seat height adjustment. Here, levers are regularly used in the form of front and rear height adjustment levers for a height-adjustable bearing of a seat part on a seat base of the vehicle seat. In a vehicle seat usage situation, the height adjustment levers thereby transfer the loads caused by the seat part and a vehicle seat user into the seat base. Usually, such height adjustment levers are configured to transfer the loads occurring in the usage situation into the seat base without being irreversibly deformed themselves. Therefore, such height adjustment levers are usually made of a rigid material.

As the result of an accident, in particular a rear impact of another vehicle at high speed, the vehicle seat user may experience a strong acceleration relative to the seat base. Due to a rigid coupling of the vehicle seat to the seat base, for example by the aforementioned height adjustment levers, an abrupt deceleration of the vehicle seat user may occur. Such accidents can lead to serious injuries, in particular in the head area. In addition, during such abrupt deceleration, a large number of components of the vehicle seat are regularly subjected to high accident loads. Typical accident loads could be torques acting on a backrest and tensile loads acting on a seat height adjustment.

To protect the vehicle seat user and to relieve the vehicle seat, the height adjustment levers in particular can therefore be used for the targeted conversion of the kinetic energy caused by the accident into deformation energy. It can be advantageous to convert as much of the kinetic energy as possible into deformation energy.

DE 10 2014 013 295 A1 describes a lever in which a deformation position in an accident allows a deformation movement of a bearing portion of the lever within an annular region surrounding the mounting portion. However, this solution only allows a limited deformation movement, in particular with limited installation space.

The object is to improve a reduction of loads introduced into the lever.

This object is achieved by a lever with the features of claim 1.

Such a lever for a vehicle seat has: two bearing portions for pivotally connecting the lever to a respective further component, for example a seat part of the vehicle seat and a seat base of the vehicle seat, a carrier element via which forces can be transmitted between the bearing portions, a displacement element on which one of the bearing portions is provided, and a longitudinally extending guide portion. In an initial position of the lever, the guide portion is blocked by a deformation portion such that the displacement element is fixed relative to the carrier element. In this case, the deformation portion can be deformed by the action of forces acting between the bearing portions in such a way that the guide portion is released and the displacement element can be displaced relative to the carrier element.

The displacement element enables a particularly wide relative movement between the bearing portions in the event of a crash, which means that loads can be dissipated particularly efficiently.

The length of a deformation path that can be released by deformation of the deformation portion can be predetermined by the length of the guide portion of the displacement element. In particular, the guide portion can correspond substantially to the distance between the bearing portions in the initial position. In principle, the deformation path can correspond to a braking path on which the vehicle seat user is braked in their relative movement to the vehicle, in particular the seat base, in the event of an accident. Braking the vehicle seat over the longest possible braking distance can reduce the risk of injury and/or the accident loads acting on the vehicle seat. Thus, affected components of the vehicle seat, such as rails, backrest fittings, seat subframes and backrest frames, can also be configured for lower maximum loads. This can reduce material and/or manufacturing costs.

In the initial position, the bearing portions are at a first distance apart. In the event of a load acting on the bearing portions, in particular a tensile load, the lever can be extended telescopically around the deformation path by moving the displacement element along the deformation path. Thus, in a released position, the lever may have a second distance between the bearing portions that is, for example, greater than the first distance. The second distance and the first distance can differ just by the deformation distance. The deformation path can correspond to a longitudinal extension of the deformation portion.

It can be provided that the deformation portion can only be deformed by the action of forces (in particular plastic) that exceed a predetermined threshold value. In this way, deformation of the deformation portion can be avoided in a normal operating situation.

In one embodiment of the proposed lever, the deformation portion may comprise a different material than the guide portion and/or the bearing portion of the displacement element. In particular, the material of the deformation portion may have a lower strength than the material of the guide portion and/or the bearing portion. In an alternative embodiment, the deformation portion may be made of the same material as the guide portion and/or the bearing portion. Thus, the deformation portion for the deformable design can have material weakenings. Such material weakenings can be achieved, for example, by a material thickness that differs at least in places from that of the guide portion and the bearing portion. In principle, the definition portion can be configured to reduce loads introduced into the lever by irreversible plastic deformation. In this context, the term deformation includes both the plastic deformation of the deformation portion and a destruction of the deformation portion in the sense of breaking it into several parts.

In particular, the deformation portion can be deformable for the conversion of tensile loads by compression, i.e. it can be configured and arranged to be compressible.

Generally, the deformation portion can be arranged in the initial position (in particular completely) between the bearing portions of the lever. In particular, each of the bearing portions may be spaced apart from the deformation portion. The bearing portion of the displacement element may be fixed relative to the displacement element, even in the case of loads brought about by an accident.

By way of example, the guide portion can be formed on the displacement element. For example, the guide portion and the deformation portion may be arranged on the displacement element. In this way, the carrier element can be finished with a high degree of stability. In particular, local stability reductions on the carrier element can be avoided in this way.

In one embodiment of the proposed solution, the carrier element may be connected to the displacement element via a fastening part. For example, the fastening part secures the displacement element to the carrier element, and in particular in such a way that it cannot be separated from the carrier element both in the initial position and in a released position. Such a fastening part can in particular be configured and connected to the carrier element in such a way that a maximum load capacity of the fastening part exceeds a maximum load capacity of the deformation portion. In principle, the fastening part can be connected to the carrier element by means of a force fit, a form fit or a material fit. In an exemplary embodiment, the fastening part may be formed as a bolt fixed to the carrier element. On the side of the displacement element, the fastening part can rest against the deformation portion. Thus, with the deformation element intact, the fastening part can be fixed relative to the displacement element, wherein the deformation portion can be deformed by forces exceeding the threshold value. Thus, the fastening part can be moved relative to the displacement element along the deformation path defined by the guide portion by forces exceeding the threshold value. The deformation portion may be deformed in the process.

To connect the carrier element to the displacement element via a fastening part, the carrier element and the displacement element, in particular the guide portion of the displacement element, can each have an opening.

The deformation portion and the guide portion may overlap. In particular, the opening of the guide portion can thus be introduced in the deformation portion.

In one embodiment of the proposed lever, the fastening part may extend through the opening in the carrier element and the opening in the guide portion. By way of example, the fastening part can be a screw, a bolt or a rivet.

The guide portion is formed, for example, with a slotted guide. To fix the displacement element relative to the carrier element, the slotted guide can be at least partially closed by the deformation portion in the initial position. The fastening part can penetrate the slotted guide. This allows for a robust and at the same time space-saving construction. By way of example, the slotted guide can be closed by the deformation element except for the opening through which the fastening part extends. Loads introduced into the lever and exceeding the threshold value can cause the fastening part to be movable along the deformation path in the slotted guide by deformation (in particular compression) of the deformation portion. The fastening part can at least partially rest against a border of the slotted guide. The slotted guide can be configured with two (in particular rigid) webs that are parallel to each other. These can be adjacent to the bearing portion of the displacement element. The deformation portion can be arranged between the parallel webs.

The slotted guide can be tapered along the deformation path. A boundary of the slotted guide can enclose an acute angle with the deformation path as an example. This allows the lever to be clamped in the released position and thus fixed in order to block a return of the lever to the initial position after a release.

The lever may have a forming portion. The forming portion may be formed with a step that acts on the deformation portion, e.g. deforming and/or compressing, by the action of the forces acting between the bearing portions. Such stages can be produced, by way of example, by forming processes and thus with particularly low effort.

The forming portion may be formed on an inside of the carrier element. By way of example, the carrier element is shaped as a hollow body that surrounds an interior. The forming portion may extend into the interior space. In this way, the forming portion can be protected against external influences. This can reduce the likelihood of interference with the proper release of the lever in the event of an accident. Furthermore, an arrangement of the forming portion on the inside can be produced by a local tapering of the carrier element. This can further reduce the manufacturing effort.

In principle, the lever can have a plurality of deformation portions and/or deformation paths. By way of example, this means that more energy can be absorbed by the lever when it is released. Likewise, a multi-stage release behavior can be realized.

The fastening part may be located adjacent to the forming portion. This can improve controlled deformation of the deformation portion by the forming portion. In this case, the forming portion can be moved along the deformation path with deformation of the deformation portion when the lever is released. Furthermore, the fastening part can be moved along a further deformation path under deformation of a further deformation portion when the lever is released. By way of example, the deformation of the deformation portion by the forming portion may exhibit plastic material displacement. Alternatively or additionally, the deformation of the further deformation portion by the fastening part may, by way of example, have the effect of tearing open the further deformation portion. This may allow for a compact design of the proposed lever.

Furthermore, the displacement element can have a (particularly rigid) end stop that limits the deformation path. This allows a long deformation path while at the same time safely preventing the displacement element from being torn out. Such an end stop can limit the telescopic movement of the displacement element relative to the carrier element. Accordingly, the arrangement of the end stop on the displacement element can define the second distance between the bearing portions in the released position of the lever. By way of example, the rigid end stop can be configured with a web. The web can be arranged orthogonally to the deformation path defined by the guide portion on the displacement element. In one embodiment, the end stop can be wedge-shaped relative to the deformation path. This allows the lever to be clamped in the released position and thus fixed in order to block a return of the lever to the initial position after a release. In principle, the length of the deformation path can be configured by the arrangement of the end stop and the length of the webs of the displacement element.

In one embodiment, the length of (a deformation path or) the deformation path may correspond to at least one tenth, preferably at least one eighth, preferably at least one sixth, preferably at least one quarter, preferably at least one half or preferably at least three-quarters of the distance between the two bearing portions in the initial position. In principle, longer deformation paths are also conceivable and possible. Thus, particularly preferably, the length of one or the deformation path can also correspond to the distance or be more than the distance.

Optionally, the carrier element is configured as a hollow carrier with an interior. In this case, the deformation portion can be arranged in the initial position, in particular largely or completely, in the interior of the carrier element. The design of the carrier element as a hollow carrier can increase the rigidity of the carrier element. This can reduce the amount of material needed to achieve a desired stiffness of the lever. Furthermore, it is possible in this way to protect the deformation element from external influences, in particular from unwanted damage. In principle, the displacement element can be guided with a portion or element on the carrier element. In one embodiment of the proposed solution, the displacement element may have a guide element for this purpose, which is guided on the carrier element. By way of example, the guide element can lie against an inside of the interior of the carrier element formed as a hollow carrier. The guide element is formed, for example, with a plastic element molded onto the displacement element.

The bearing portions can be outside the deformation portion. By way of example, the deformation portion can be arranged between the two bearing portions. The deformation of the deformation portion can thus be accompanied without deformation of the bearing portions. In this way, functional impairment of the bearing portions can be avoided when the lever is released. In particular, the replacement of the released lever may be limited to the replacement of the deformation portion. This can reduce the costs associated with replacement.

In one embodiment of the proposed lever, the carrier element may have the other bearing portion of the two bearing portions. In particular, the bearing portion of the carrier element can also be fixed relative to the carrier element in the event of loads brought about by an accident.

In a further development of the proposed solution, the lever can have a further guide portion and a further displacement portion on which the other bearing portion of the two bearing portions is provided. In this alternative, both bearing portions are each formed on one of the two displacement elements. The further guide portion may be blocked in an initial position by a deformation portion such that the further displacement element is fixed relative to the carrier element. In this case, the deformation portion of the further displacement element can be deformed by the action of forces acting between the bearing portions in such a way that the further guide portion is released and the further displacement element can be moved relative to the carrier element along a deformation path defined by the further guide portion.

By way of example, the further displacement element can have the further guide portion identical in construction to the first-mentioned displacement element.

In particular, both the displacement element and the further displacement element in the embodiment of the lever with a displacement element and a further displacement element can each have a deformation path. The deformation path of the lever corresponds to the sum of the deformation paths of the displacement elements. This makes it possible to provide a particularly wide deformation path. In one embodiment, the displacement element and the further displacement element can be arranged coaxially to each other. By way of example, the displacement element can have a longitudinal extension axis and the further displacement element can have a further longitudinal extension axis. The longitudinal extension axis and the further longitudinal extension axis can correspond to each other in the coaxial arrangement. In an alternative embodiment, the displacement element and the further displacement element can be arranged parallel to each other. Accordingly, the longitudinal extension axis and the further longitudinal extension axis can run parallel to each other. The longitudinal extension axis and the further longitudinal extension axis can be offset from each other in a spatial direction. In particular, the longitudinal extension axis and the further longitudinal extension axis can be offset from each other in such a way that the displacement elements are arranged overlapping on the carrier element in the initial position (e.g. along the spatial direction). Each of the parallel displacement elements can have a deformation path that essentially corresponds to the distance between the bearing portions in the initial position. Thus, the deformation path of the lever can correspond substantially to twice the distance between the bearing portions in the initial position. In particular, the deformation path of the lever can be greater than the distance between the bearing portions in the initial position. Accordingly, the lever can be manufactured with a particularly small installation space requirement. This can reduce an assembly effort and/or manufacturing costs. Alternatively or additionally, the braking distance can be further increased compared to an embodiment with only one displacement element.

In a supplementary or alternative embodiment, the deformation portion of the displacement element and the deformation portion of the further displacement element can be formed differently, e.g. have different material properties, such as different strength. In particular, the deformation portions can have different material thicknesses compared to each other.

Due to different strengths of the displacement element and the further displacement element, the deformation portions can have different threshold values. Accordingly, the deformation portion of one of the two displacement elements can be deformable when the applied loads exceed a first threshold value. Furthermore, the deformation portion of the other of the two displacement elements can be deformable when the applied loads exceed a second threshold value. Thus, the lever can be released in several stages, in particular in two stages. Due to a multi-stage release capability, braking of the vehicle seat user may be non-linear and/or discontinuous. In some applications, this can further reduce the risk of injury and the structural loads that occur.

In alternative or complementary embodiments, the strength of at least one of the deformation portions may vary along the deformation path. By way of example, the deformation portion may have a plurality of different materials along the deformation path. Optionally, the deformation portion has a series of different material weakening s along the deformation path. In one embodiment, these can be formed by different material thicknesses of the deformation portion. In principle, however, the same material thicknesses and/or strengths of the deformation portions of all displacement elements are also conceivable and possible.

The carrier element can be made in one piece. Alternatively, the carrier element can also be made of several parts. In this case, two parts of the carrier element can be connected via a connecting element. Two connecting portions may be provided on the connecting element, and the connecting element may have two longitudinally-stretched guide portions. The guide portions may each be blocked in an initial position by a deformation portion so that the connecting element is fixed relative to each of the two parts of the carrier element connected to the connecting element. The deformation portions of the connecting element can be deformed by the action of forces acting between the bearing portions in such a way that the guide portions of the connecting element are released and the connecting element can be moved with one of the guide portions in each case relative to one of the connected parts of the carrier element along the deformation path predetermined by the respective guide portion. The two deformation portions of the connecting element can have different strengths in order to enable a multi-stage release of the lever. In principle, the connecting element can be arranged parallel or coaxially in relation to the displacement element and any further element elements of the lever. The installation space of the lever can be further reduced by arranging the displacement element of the connecting element and any further displacement elements in parallel pairs.

Furthermore, the aforementioned object is also achieved by a vehicle seat having at least one lever in one of the aforementioned embodiments.

Such a vehicle seat may have a seat base, a backrest and a seat part. The seat part may be used in a use position to provide a seat surface for a vehicle seat user. In addition, the backrest in the use position may be used to provide a backrest surface for supporting the back of the vehicle seat user. The seat part can be mounted on the seat base via the at least one lever. Furthermore, the backrest can be pivotally mounted on the seat base. In an alternative embodiment, the backrest can be mounted on the seat part.

The at least one lever is pivotally mounted on two components of the vehicle seat. In particular, the at least one lever may be pivotally mounted on the seat part and the seat base of the vehicle seat. For this purpose, the seat part can have a front bearing point on a front side facing away from the backrest for the pivotable bearing of a front lever. Furthermore, on a rear side of the seat part facing the backrest, the seat part may have a rear bearing point for the pivotable mounting of a rear lever. In this case, the pivotable bearing of the front lever at the front bearing point of the seat part defines a front pivot axis of the seat part about which the front lever can be pivoted relative to the seat part. Furthermore, the bearing of the rear lever at the rear bearing point of the seat part defines a rear pivot axis of the seat part about which the rear lever can be pivoted relative to the seat part.

Similarly, the seat base can have a front bearing point on a front side facing away from the backrest for the pivotable bearing of the front lever. Furthermore, the seat base may have a rear bearing point on a rear side of the seat base facing the backrest for pivotally bearing the rear lever. Accordingly, the front bearing point of the seat base defines a front pivot axis about which the front lever is pivotable relative to the seat base. In addition, the rear bearing point defines a rear pivot axis about which the rear lever can pivot relative to the seat base.

In one embodiment, at least one of the levers is part of a seat height adjustment of the seat part, with which the seat part can be adjusted relative to the seat base.

If the loads acting on the vehicle seat exceed the predetermined threshold, the seat part can thus be pivoted relative to the seat base by the deformation path of the at least one lever. In this case, the pivoting of the seat part relative to the seat base can transfer the applied loads at least proportionally into a plastic deformation of the at least one deformation portion of the lever.

The at least one lever may be the front lever of the seat height adjustment, wherein the front lever is adjustable from the initial position to a released position in the event of an accident by tensile loads acting on the bearing portions. In particular, this allows the forces acting on the vehicle seat user in the event of a rear-end collision to be effectively converted into deformation energy.

The preceding explanations regarding the embodiments and advantages of the proposed lever apply analogously to the proposed vehicle seat with at least one lever.

The attached figures illustrate exemplary possible embodiment variants of the proposed solution.

Figure 1A:
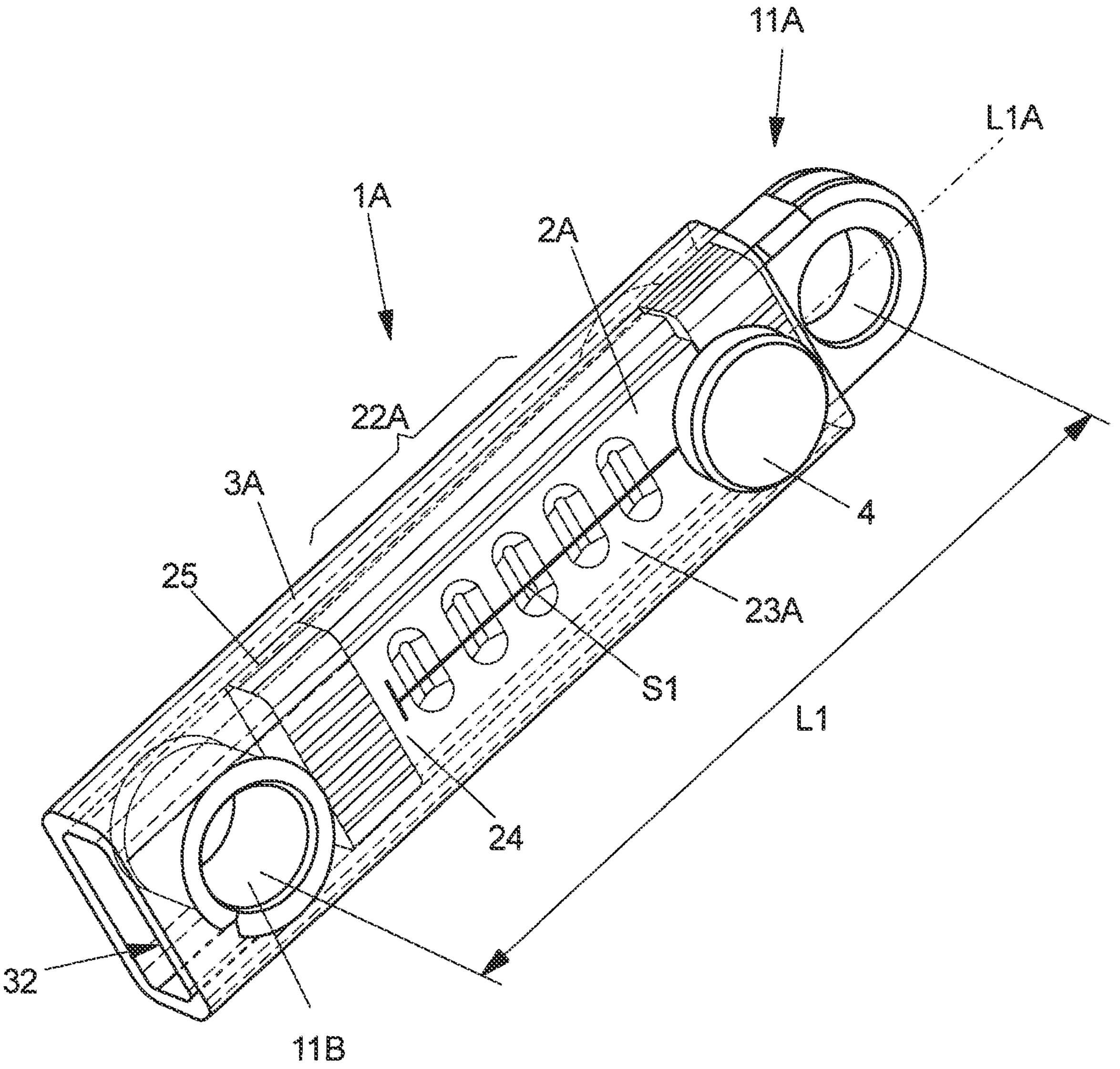
FIG. 1A shows a perspective representation of a first embodiment of a lever having a carrier element and a displacement element in an initial position.
Figure 1B:
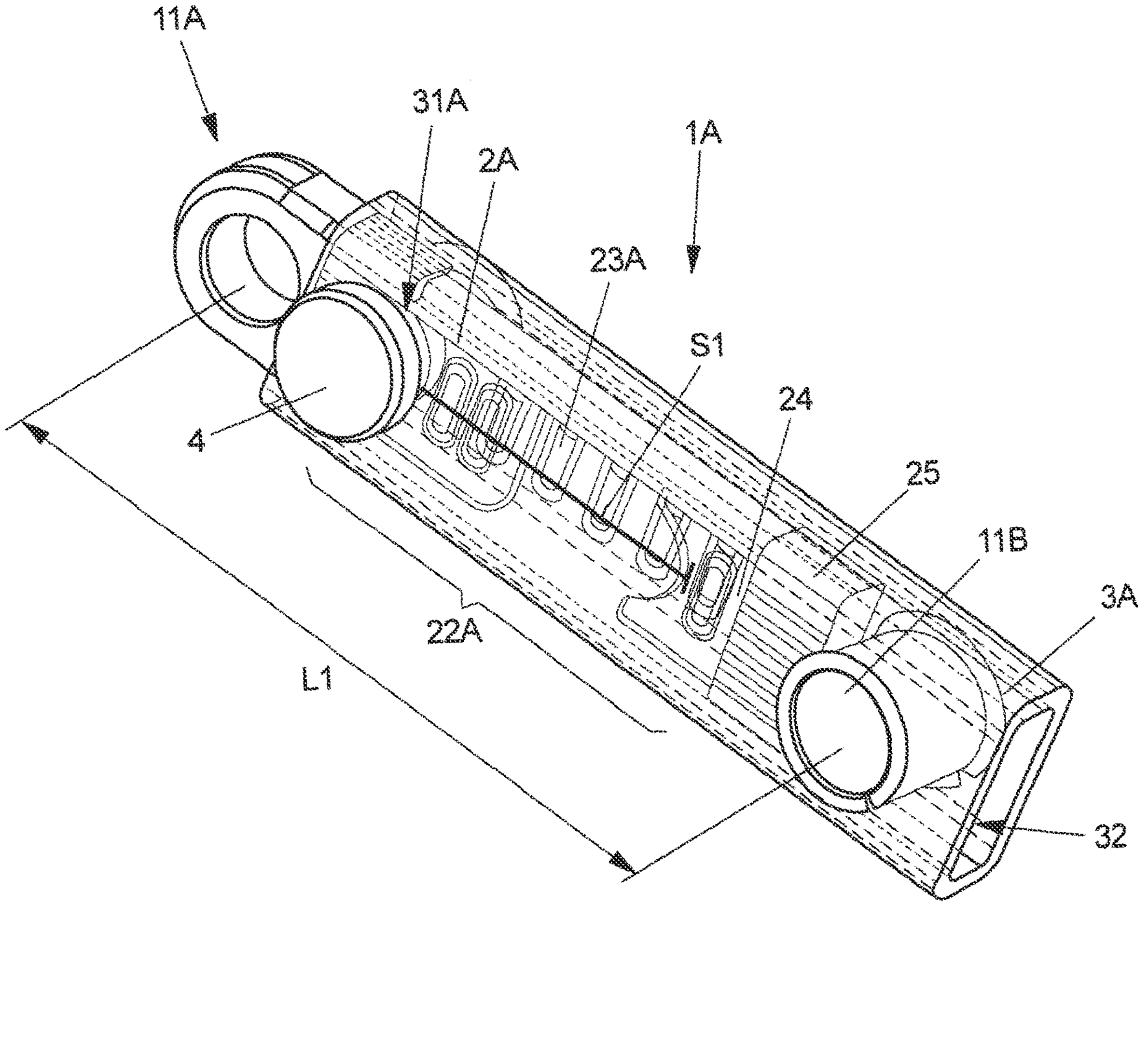
FIG. 1B shows a perspective representation of a rear view of the lever from FIG. 1A.

FIGS. 1A and 1B show a lever 1A with two bearing portions 11A, 11B for pivotally connecting the lever 1A to a further component in each case, a carrier element 3A, via which forces can be transmitted between the bearing portions 11A, 11B, and a displacement element 2A, which has one of the bearing portions 11A, 11B and an elongate guide portion 22A. In an initial position of the lever 1A, the guide portion 22A is blocked by a deformation portion 23A, in the present case completely obstructed, such that the displacement element 2A is fixed in its position relative to the carrier element 3A against a translation thereto. In this case, the deformation portion 23A can be deformed by the action of forces acting between the bearing portions 11A, 11B in such a way that the guide portion 22A is released and the displacement element 2A can be moved with the guide portion 22A relative to the carrier element 3A along a deformation path S1 predetermined by the guide portion 22A.

The carrier element 3A according to FIGS. 1A and 1B is configured as a hollow body; by way of example, with a substantially rectangular cross-section. The hollow body encloses an interior 32, which is open at each of two opposite end portions of the carrier element 3A. In the area of one of the end portions of the carrier element 3A, the bearing portion 11B is arranged for pivotally bearing the lever 1A on a component. This bearing portion 11B is formed in the present case by a bearing sleeve arranged at a through-opening in the carrier element 3A.

The bearing portion 11A arranged on the displacement element 2A projects through the other of the two end portions of the carrier element 3A. The bearing portion 11B and the bearing portion 11A have the first distance L1 between each other. This bearing portion 11A of the displacement element 2A is configured in the form of a through-opening in the displacement element 2A. The bearing portions 11A, 11B each have a cylindrical through-opening for forming a pivot connection. Here, the corresponding cylinder axes are oriented parallel to each other.

The guide portion 22A of the displacement element 2A is arranged in the interior 32. Along a longitudinal extension axis L2A of the displacement element 2A between the guide portion 22A and the bearing portion 11A, the displacement element 2A is connected to the carrier element 3A via a fastening part 4 in the form of a bolt. The fastening part 4 is fastened on the carrier element 3A. The fastening part 4 extends through an opening 31A in the carrier element 3A and an opening in the displacement element 2A. As will be explained below with reference to FIG. 2, the opening in the displacement element 2A is formed by a slot, which is otherwise closed by the deformation portion 23A. The deformation portion 23A extends on the side facing away from the bearing portion 11A from the opening (not shown) in the guide portion 22A along the longitudinal extension axis L2A.

Thus, the fastening part 4 can be moved relative to the displacement element 2A by a tensile load introduced into the bearing portion 11A and exceeding a threshold value along the deformation path S1 with simultaneous deformation of the deformation portion 23A. This allows the lever 1A to be extended telescopically. In the embodiment shown, the deformation portion 23A has an alternating material thickness along the deformation path S1. This reduces the strength of the deformation portion 23A relative to the guide portion 22A and/or the bearing portion 11A.

The deformation path S1 is limited (on a side facing away from the fastening part 4 in the initial position) by an end stop 24. For guiding the displacement element 2A on the carrier element 3A, the displacement element 2A has, on its side facing away from the bearing portion 11A, a guide element 25 that rests against the inside of the interior 32 and is guided thereon. In the embodiment of the lever 1A shown in FIGS. 1A and 1B, the guide element 25 is formed as a plastic overmolding. In the embodiment shown in FIGS. 1A and 1B, the guide portion 22A closed with the deformation portion 23A occupies substantially the entire length between the fastening part 4 and the end stop 24 (with the guide element 25).

The deformation portion 23A is arranged between the bearing portions 11A, 11B.

The bearing portions 11A, 11B each define a pivot axis of the lever 1A. The deformation portion 23A is thus located between the pivot axes. The pivot axes are arranged outside of the deformation path S1.

Figure 2:
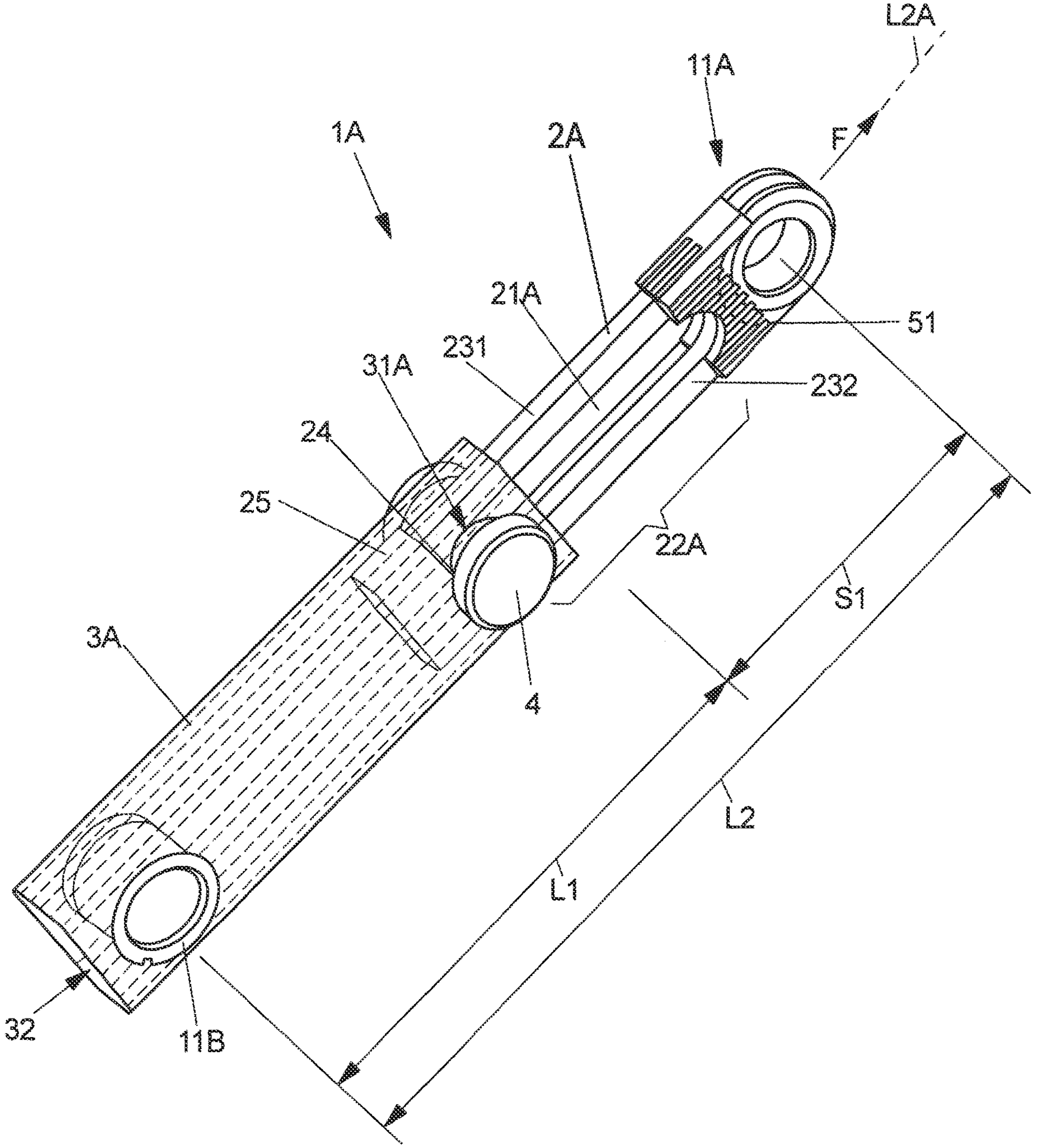
FIG. 2 shows a perspective representation of the lever from FIG. 1A in a released position.

FIG. 2 shows the lever 1A in the embodiment from FIGS. 1A and 1B in a released position. Accordingly, with respect to FIGS. 1A and 1B, the displacement element 2A is moved along the longitudinal extension axis L2A of the displacement element 2A by a tensile force introduced into the bearing portion 11A with respect to the other bearing portion 11B. Here, the fastening part 4 rests against the end stop 24 of the displacement element 2A. By moving the displacement element 2A, the fastening element 4 is guided along the deformation path S1 while causing deformation of the deformation portion 23A shown in FIGS. 1A and 1B. As a result of the deformation of the deformation portion 23A, the aforementioned opening 21A in the displacement element 2A, which is configured as a slotted guide, is released in FIG. 2. The slotted guide is formed by two parallel webs 231, 232, which adjoin the bearing portion 11A of the displacement element 2A and are connected via the end stop 24 (and the optional guide element 25) on a side facing away from the bearing portion 11A of the displacement element 2A.

In the illustrated released position of the lever 1A, the bearing portion 11A of the displacement element 2A and the bearing portion 11B of the carrier element 3A have a second distance L2. This differs by the telescopic displacement of the displacement element 11A relative to the carrier element 3A compared to the first distance L1 just by the deformation path S1.

Instead of being in the form of a hollow carrier, the carrier element 3A can also be solid, for example. Furthermore, the displacement element 2A may in principle have a deformation portion 23A that does not have alternating material thicknesses. A targeted reduction of the strength of the deformation portion 23A relative to the guide portion 22A and the bearing portion 11A is alternatively or additionally also possible by using different materials. Additionally or alternatively, the deformation portion 23A may be perforated in places to reduce strength and/or have a reduced material thickness compared to the webs 231, 232.

Optionally, the guide element 25 is formed integrally with the displacement element 2A. In particular, the guide element 25 and the displacement element 2A may be made of the same material.

Figure 3:
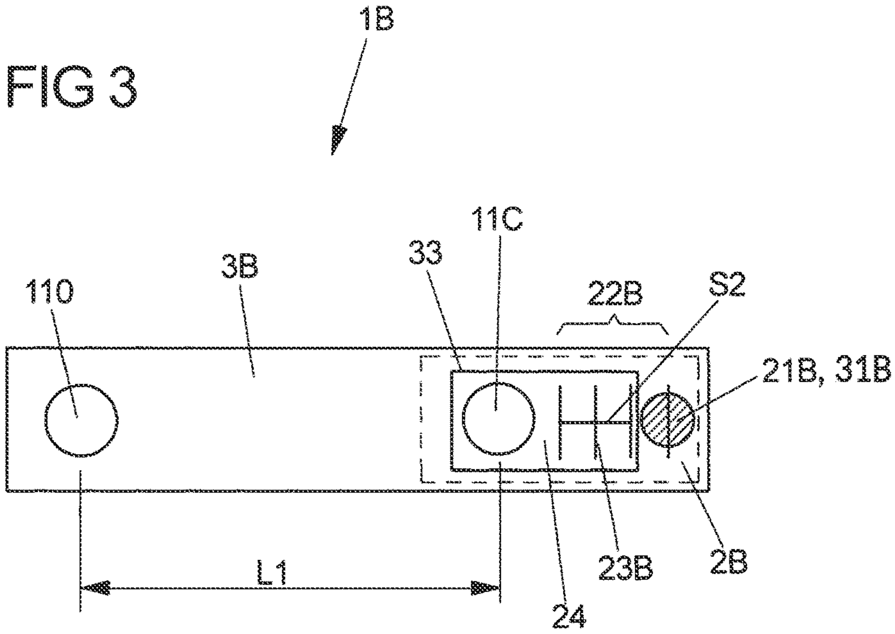
FIG. 3 shows a side view of a second embodiment of the lever.

FIG. 3 shows a lever 1B with two bearing portions 11C, 11D and a displacement element 2B, which (in the plane of the figure shown) is completely in line with the carrier element 3B. The displacement element 2B has the one bearing portion 11C. In the plane shown in FIG. 3, this bearing portion 11C is aligned with a slotted hole 33 of the carrier element 3B. In this case, the bearing portion 11C is arranged at an end portion of the slotted hole 33 facing the bearing portion 11D.

To connect the displacement element 2B to the carrier element 3B, the displacement element 2B has an opening 21B and the carrier element 3B has an opening 31B. Thus, the displacement element 2B and the carrier element 3B can be connected via a fastening part (not shown) (e.g. the fastening part 4 described above), which can extend through the aligned openings 21B, 31B. The opening 21B in the displacement element 2B extends through the guide portion 22B, which is in turn blocked with a deformation portion 23B. Thus, the displacement element 2B is fixed with respect to a displacement with respect to the carrier element 3B, provided that the loads introduced into the bearing portions 11C, 11D do not exceed a predetermined threshold.

By introducing tensile loads exceeding the threshold value into the bearing portions 11D, 11C, the displacement element 2B with the bearing portion 11C can be moved relative to the bearing portion 11D by the deformation path S2. In the process, the deformation portion 23B is plastically deformed. Furthermore, the deformation path S2 is limited by an end stop 24.

According to FIG. 3, one of the bearing portions 11C, 11D, in this case the bearing portion 11C of the displacement element 2B, is arranged between the other bearing portion 11D (here of the carrier element 3B) and the deformation portion 23B.

Figure 4:
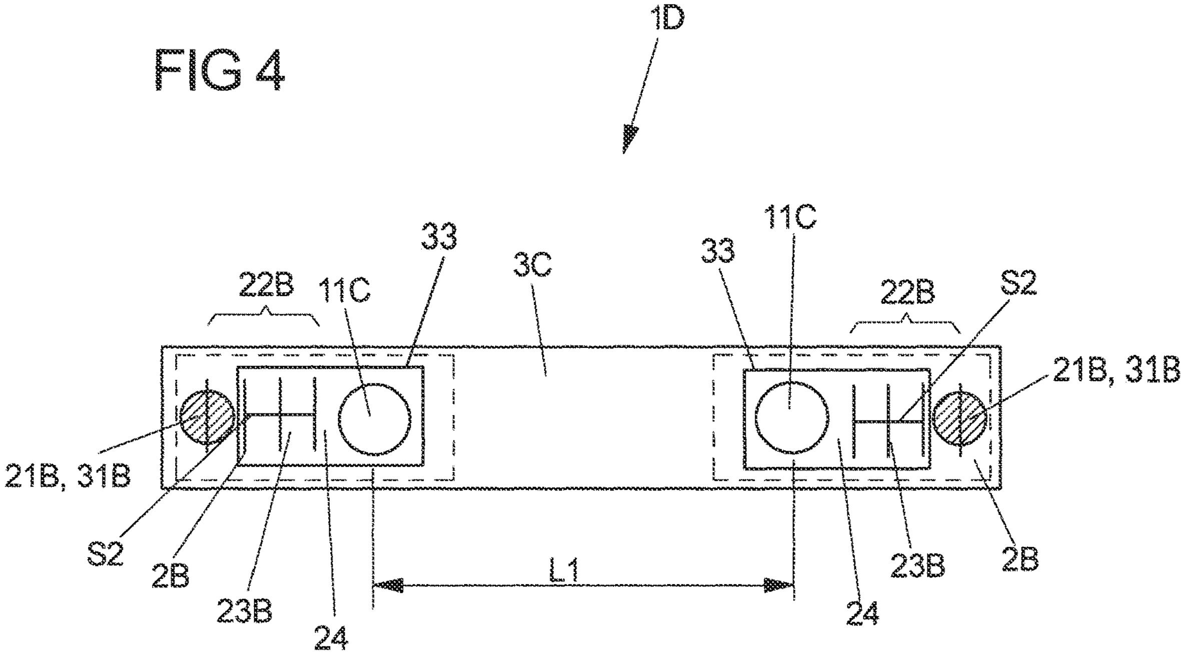
FIG. 4 shows a side view of a third embodiment of a lever having the carrier element and two of the displacement elements.

The lever 1D according to FIG. 4 has a carrier element 3C, which provides an opening 31B in areas of two opposite end portions for connecting the carrier element 3C to one of two displacement elements 2B respectively. Furthermore, this lever 1D comprises two displacement elements 2B, each of which is configured analogously to the displacement element 2B shown in FIG. 3.

Each of the displacement elements 2B shown can be mounted on the carrier element 3C via a fastening part 4 (not shown in FIG. 4), as described above. Thus, each of the fastening parts 4 can be moved along a respective deformation path S2 in the corresponding guide portion 22B by the introduction of loads exceeding the threshold value. The deformation paths S2 of the displacement elements 2B are each limited by an end stop 24. The deformation path of the lever 1D thus corresponds to twice the deformation path S2 of one of the displacement elements 2B. In a released position, the bearing portions 11C can thus be adjusted telescopically from the first distance L1 shown to a distance L2=L1+2×S2.

Figure 5:
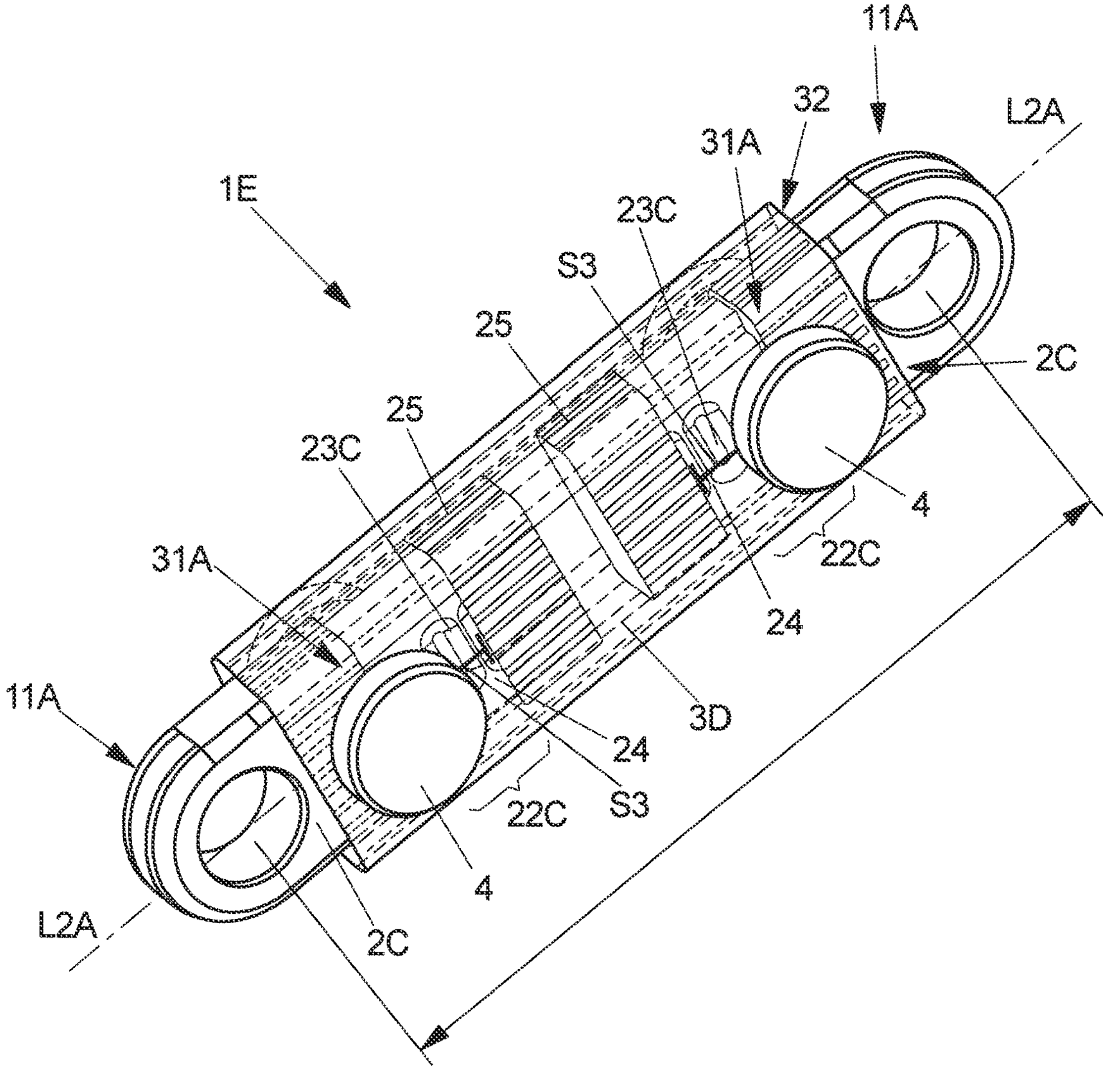
FIG. 5 shows a perspective representation of a fourth embodiment of a lever having the carrier element and two of the displacement elements in coaxial arrangement.

FIG. 5 shows a lever 1E with two coaxially arranged displacement elements 2C. Here, the carrier element 3D is again configured as a hollow body with a substantially rectangular cross-section. In the area of the end portions of the carrier element 3D, the latter has openings 31A through each of which a fastening part 4 extends. Each of the fasteners 4 secures a respective displacement element 2C to the carrier element 3D. Furthermore, each of the displacement elements 2C has a bearing portion 11A. In addition, each of the displacement elements 2C comprises a deformation portion 23C and a guide element 25, which are arranged entirely within an interior 32 of the carrier element 3D.

The fastening part 4 extends in each case through the guide portion 22C of one of the displacement elements 2C, wherein the guide portions 22C are blocked in the initial position by the deformation portions 23C. Thus, the displacement elements 2C are each fixed with respect to a displacement relative to the carrier element 3D as long as the applied loads do not exceed a threshold value. By applying loads exceeding the threshold value, both displacement elements 2C are movable along a longitudinal extension axis L2A of the displacement elements 2C with simultaneous deformation of the deformation portions 23A. In each case, a fastening part 4 is moved along a deformation path S3. Each of the deformation paths S3 is limited by an end stop 24. In addition, both displacement elements 2C are each guided by a guide element 25 on the carrier element 3D. The guide element 25 rests against the inside of the interior 32 of the carrier element 3D.

Differently formed deformation portions 23C enable different threshold values for one and the other displacement element 2C and thus a multi-stage release.

In the embodiment shown in FIG. 5, the longitudinal axes L2A of the displacement elements 2C are arranged coaxially to each other.

Figure 6:
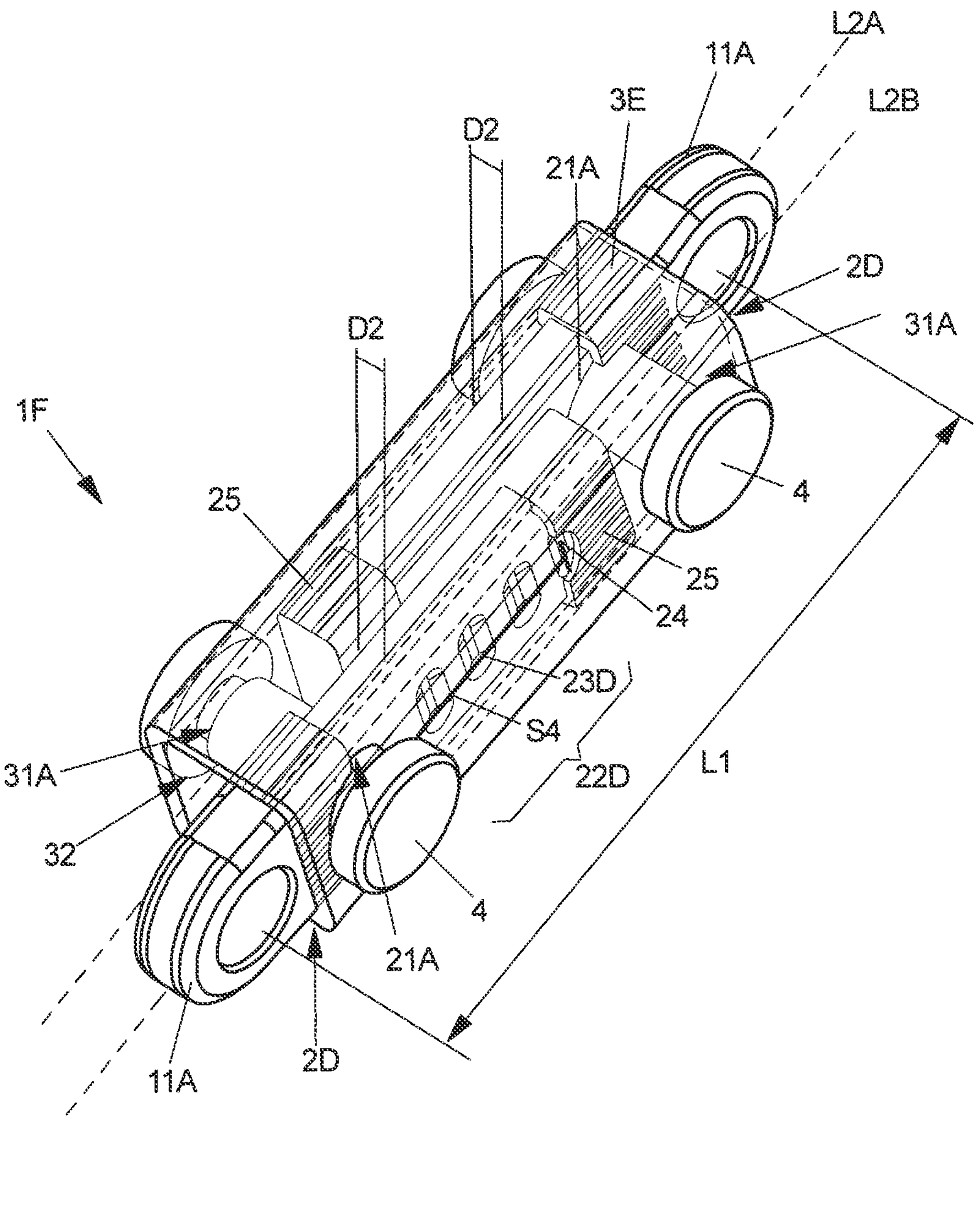
FIG. 6 shows a perspective representation of a fifth embodiment of a lever having the carrier element and two of the displacement elements in parallel arrangement.

In contrast to this, FIG. 6 shows a lever 1F with two displacement elements 2D in a laterally offset, parallel arrangement. Accordingly, one of the two displacement elements 2D has a longitudinal extension axis L2A and the other of the two displacement elements 2D has a longitudinal extension axis L2B. The longitudinal extension axes L2A, L2B are arranged parallel to each other and spaced apart.

According to FIG. 6, the carrier element 3E is configured as a hollow body with a substantially square cross-section. In the area of the end portions of the carrier element 3E, the latter has an opening 31A through which a fastening part 4 extends. Each of the two fasteners 4 secures a respective displacement element 2D to the carrier element 3E. Furthermore, each of the displacement elements 2D has a bearing portion 11A, which protrudes from one of the end portions of the hollow body. In addition, each of the displacement elements 2D has a deformation portion 23D and a guide element 25. In the present case, these are arranged entirely within the interior 32 of the carrier element 3E.

In the present case, the deformation portions 23D of both displacement elements 2D have an identical material thickness D2. In alternative embodiments, the material thickness D2 may also vary between the deformation portions 23D. By way of example, this can be used to realize a multi-stage release behavior.

Each of the fastening parts 4 extends through one of the openings 21A in one of the guide portions 22D, wherein the guide portions 22D are closed except for the openings 21A by the deformation portions 23D. Thus, the displacement elements 2D are each fixed with respect to a displacement relative to the carrier element 3E as long as the applied loads do not exceed a threshold value. When the threshold value is exceeded, both displacement elements 2D are movable along the respective longitudinal extension axis L2A, L2B with simultaneous (or successive) deformation of the deformation portions 23D. In each case, a fastening part 4 is moved along a deformation path S4. Each of the deformation paths S4 is limited by an end stop 24. In the initial position, the two deformation portions 23D at least partially overlap each other.

Each of the displacement elements 2D forms one of two bearing portions 11A of the lever 1F. The deformation path of the lever 1F thus corresponds to twice the deformation path S4 of one of the displacement elements 2D. In the released position, the bearing portions 11D are thus adjusted telescopically from the first distance L1 shown to a second distance L2=L1+2×S4. In particular, twice the adjustment path S4 can be greater than the distance L1 of the bearing portions 11A in the initial position.

Figure 7:
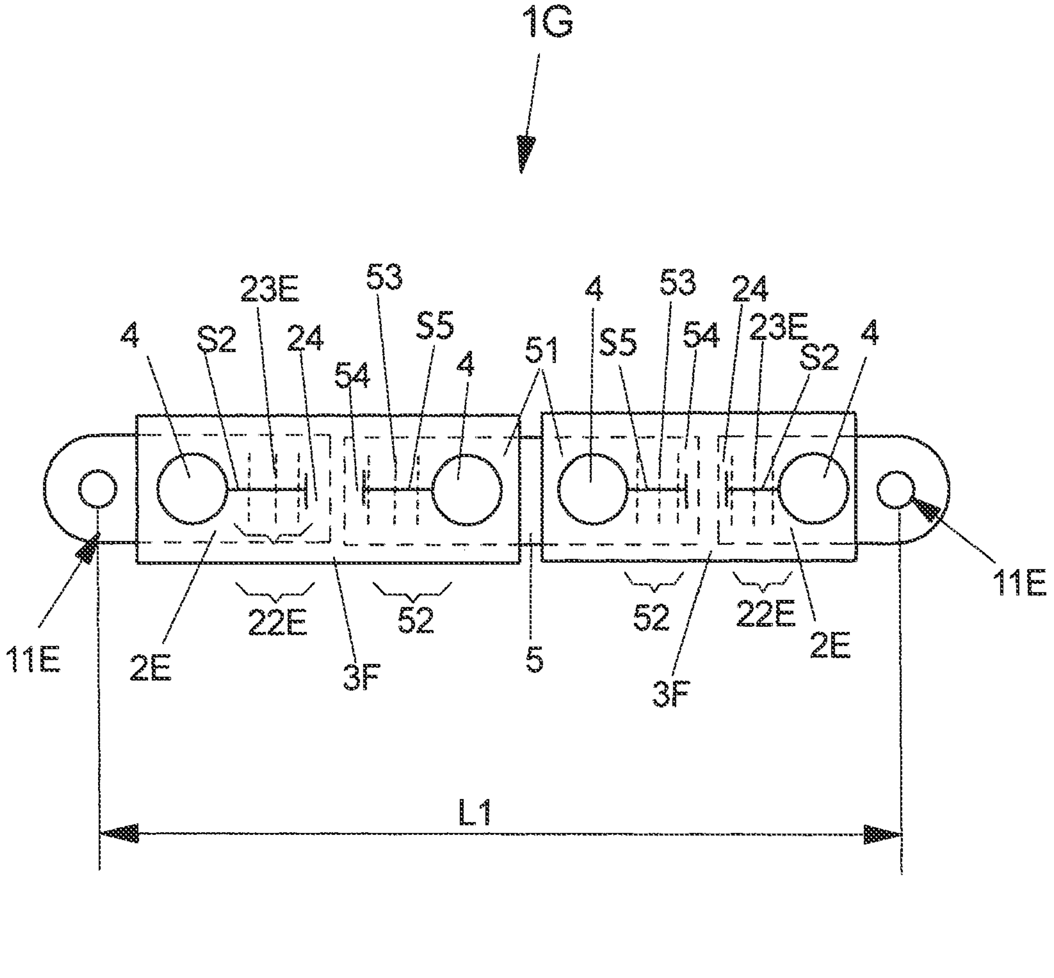
FIG. 7 shows a side view of a sixth embodiment of a lever having a two-part carrier element, two of the displacement elements and a connecting element.

FIG. 7 shows a side view of a further embodiment of a lever 1G of the proposed solution. Thus, the carrier element 3F is made of two parts. The two parts of the carrier element 3F are connected to each other via a connecting element 5. For this purpose, the connecting element 5 is fixed to each of the two parts of the carrier element 3F by means of a fastening part 4.

The connecting element 5 has two connecting portions 51 and two longitudinally stretched guide portion 52. The guide portions 52 are each blocked by a deformation portion 53 in the initial position shown in FIG. 8, so that the connecting element 5 is fixed relative to each of the two parts of the carrier element 3F connected to the connecting element 5. The deformation portions 53 of the connecting member 5 may thereby be deformed by the action of forces acting between the bearing portions 11E of the lever 1G. This allows the guide portions 52 of the connecting element 5 to be released and the connecting element 5 to be moved with a respective one of the guide portions 52 relative to one of the connected parts of the carrier element 3F along the deformation path S5 predetermined by the respective guide portion 52.

In addition, a fastening part 4 is arranged on each part of the carrier element 3F in the area of the end portion facing away from the connecting element 5. Via this, the respective part of the carrier element 3F is connected to a displacement element 2E. Each of the two displacement elements 2E has a bearing portion 11E for bearing the lever on further components. Furthermore, each of the displacement elements 2E has a guide portion 22E and a deformation portion 23E blocking the guide portion 22E. The lever 1G thus comprises more than two (namely four in the present case) deformation portions 23E, 53.

Each of the two fastening parts 4 for connecting the parts of the carrier element 3F to the two displacement elements 2E extends through one of the guide portions 22E of one of the displacement elements 2E. The displacement element 2E is fixed by the deformation portions 23E respectively with respect to a displacement relative to the part of the carrier element 3F connected to the displacement element 2E, as long as the applied loads do not exceed a threshold value. When the threshold value is exceeded, both displacement elements 2E can be moved along the respective guide portion 22E with simultaneous deformation of the respective deformation portion 23E. In each case, a fastening part 4 is moved along the respective deformation path S2. Each of the deformation paths S2 is limited by an end stop 24. The deformation path of the lever 1G thus corresponds to the sum of all deformation paths S2, S5 of the displacement elements 2E and the connecting element 5. In a released position (not shown), the bearing portions 11C can thus be adjusted telescopically from the first distance L1 shown to a second distance L2=L1+2×S2+2×S5. Thus, a multi-step release behavior can be specified.

Figure 8:
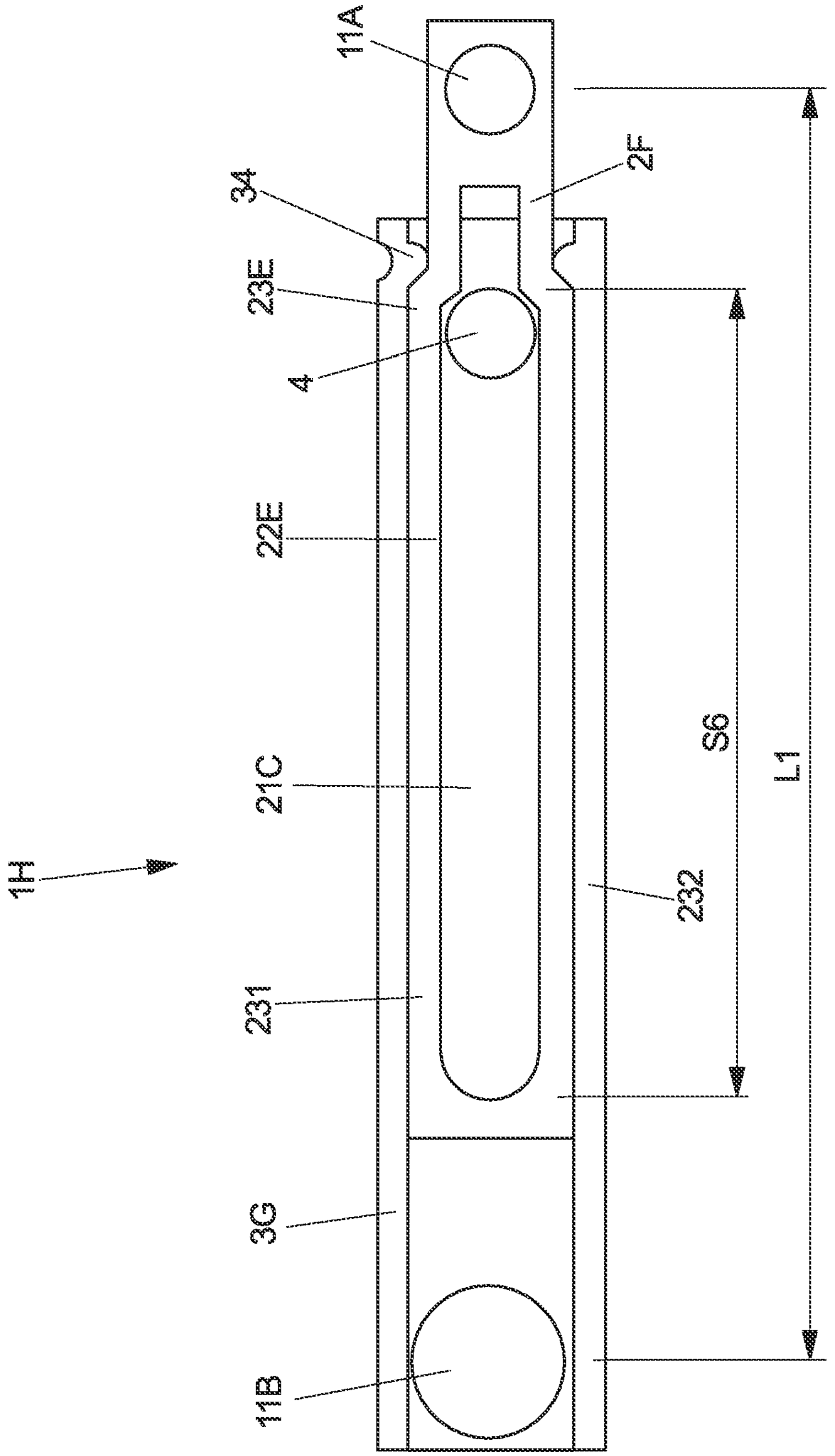
FIG. 8 shows a side view of a seventh embodiment of a lever having the carrier element with a forming portion in the initial position.

FIG. 8 shows a further possible embodiment of the proposed lever 1H. The opening 21C in the displacement element 2F is formed as a slotted hole and, in contrast to the embodiments shown in FIGS. 1A-7, is not closed by a deformation portion. The fastening part 4 can thus in principle be moved within the opening 21C. In order to fix the displacement element 2F with respect to loads that do not exceed a threshold value, the displacement element 2F is supported by at least one, in this case two, deformation portions 23E facing the carrier element 3G against a deformation portion 34 of the carrier element 3G, which is formed, by way of example, as two opposing steps. This blocks the guide portion 22E in the initial position shown in FIG. 8 (in particular against movement relative to the carrier element 3G)

Adjacent to the opposite steps, the fastening part 4 is connected to the carrier element 3G. If tensile loads exceeding the threshold value are introduced into the bearing portions 11A, 11B, the displacement element 2F can be moved relative to the carrier element 3G with deformation of the deformation portions 23E. In this case, the (in particular plastic) deformation takes the form of a displacement of the material of the deformation portions 23E of the displacement element 2F. By way of example, the material can be moved in the direction of the opening 21C, in particular compressed. During the displacement, the displacement element 2F is guided by the guide portion 22E on the fastening part 4. In particular, this can prevent the lever 1H from being retracted again after it has been released.

Figure 9:
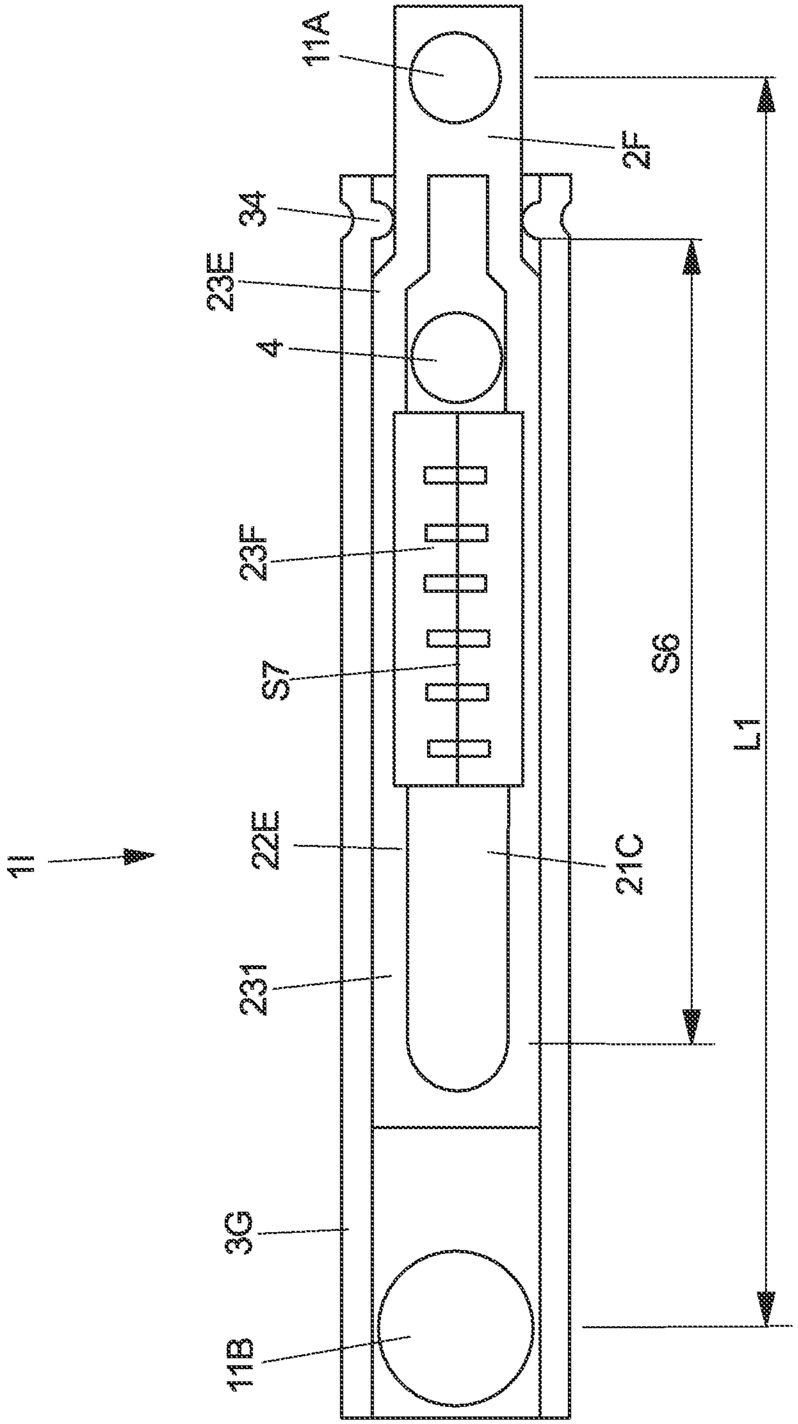
FIG. 9 shows a side view of an eighth embodiment of a lever having the carrier element with the forming portion and having the displacement element with two deformation portions in the initial position.

FIG. 9 shows an embodiment of the lever 1I, which essentially corresponds to the lever 1H shown in FIG. 8. In contrast to the lever 1H according to FIG. 8, the opening 21C of the displacement element 2F is closed by an additional deformation portion 23F (here: sectionally, alternatively completely). Thus, the lever 1I comprises a plurality of deformation portions 23E, 23F, specifically a plurality of types of deformation portions. 23E, 23F. If tensile loads exceeding the threshold value are introduced into the bearing portions 11A, 11B, the displacement element 2F can be displaced relative to the carrier element 3G only with deformation of both types of deformation portions 23E, 23F of the displacement element. The deformation portion 23F arranged in the opening 21C has the deformation path S7, which is shorter than the length of the deformation path S6 of the deformation portion 23E facing the carrier element 3G. In alternative embodiments, the deformation portions 23E, 23F may also have an inverse aspect ratio or be of equal length.

Figure 10:
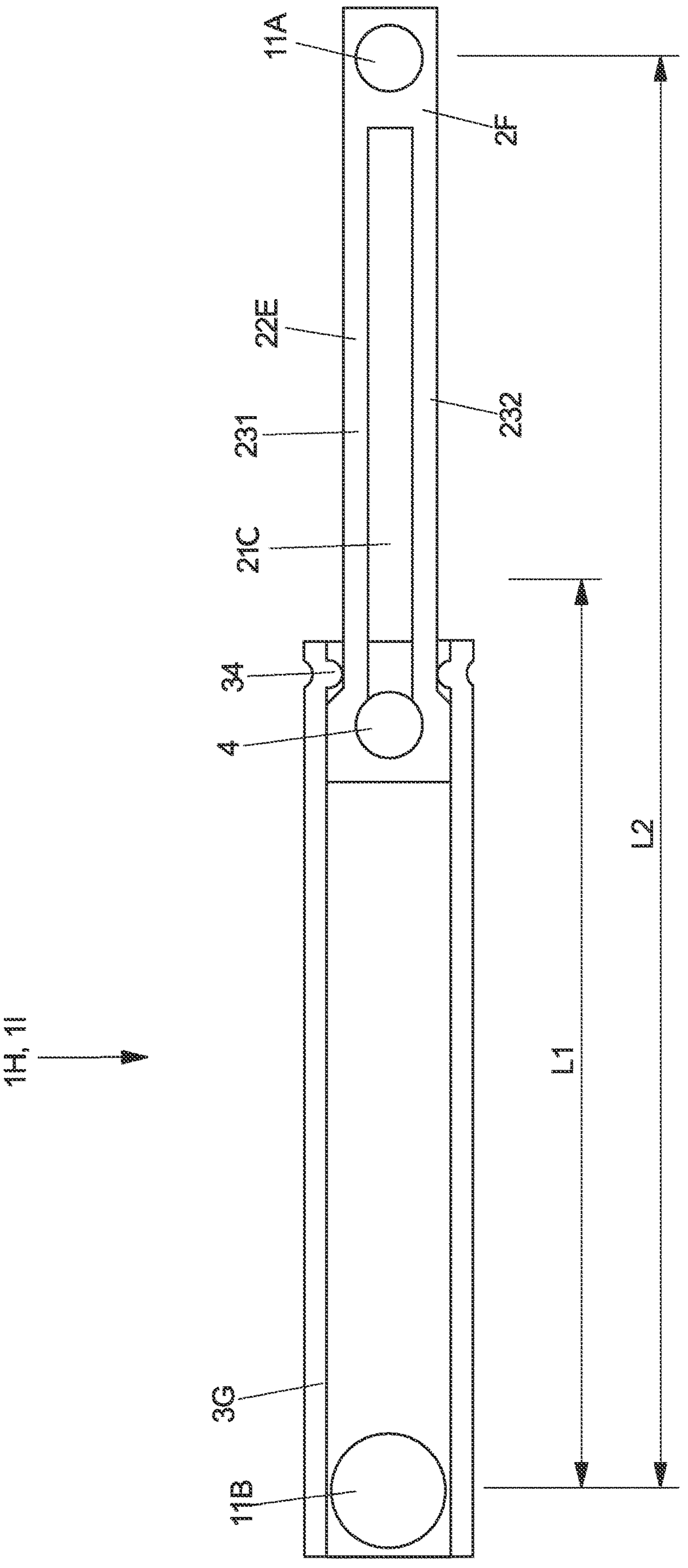
FIG. 10 shows a side view of the lever from FIGS. 8 and 9 in the released position.

FIG. 10 shows the lever 1H shown in FIG. 8, and applies equally to the lever 1I shown in FIG. 9, in each case in the released position. Accordingly, the fastening part 4 abuts an end portion of the opening 21C of the displacement element 2F. Compared to FIGS. 8 and 9, the distance L2 of the bearing portions 11A, 11B is greater than the distance L1 of the bearing portions 11A, 11B in the initial position by the length of the deformation path S6. The deformation portions 23E, 23F are deformed by the displacement of the displacement element, wherein material moved by the deformation of the deformation portion 23F of the lever 1I covering the opening 21C in the initial position according to FIG. 9 is not shown in FIG. 10. It can be seen that the opening 21C has a smaller width (perpendicular to the direction of the deformation path S6) after the displacement element 2F has been extended than in the initial position. Due to deformation, the webs 231, 232 have a smaller distance to each other than in the initial position, at least in sections.

Figure 11A:
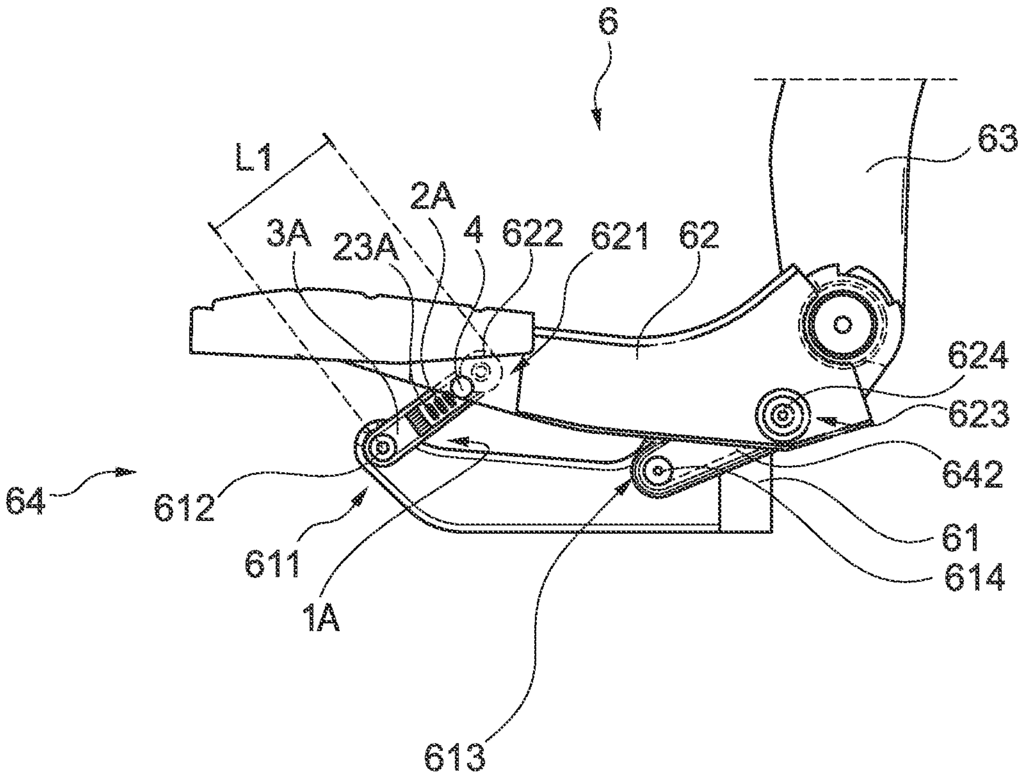
FIG. 11A shows a side view of a vehicle seat having a seat base, a seat part and a seat height adjustment with a lever in the initial position.
Figure 11B:
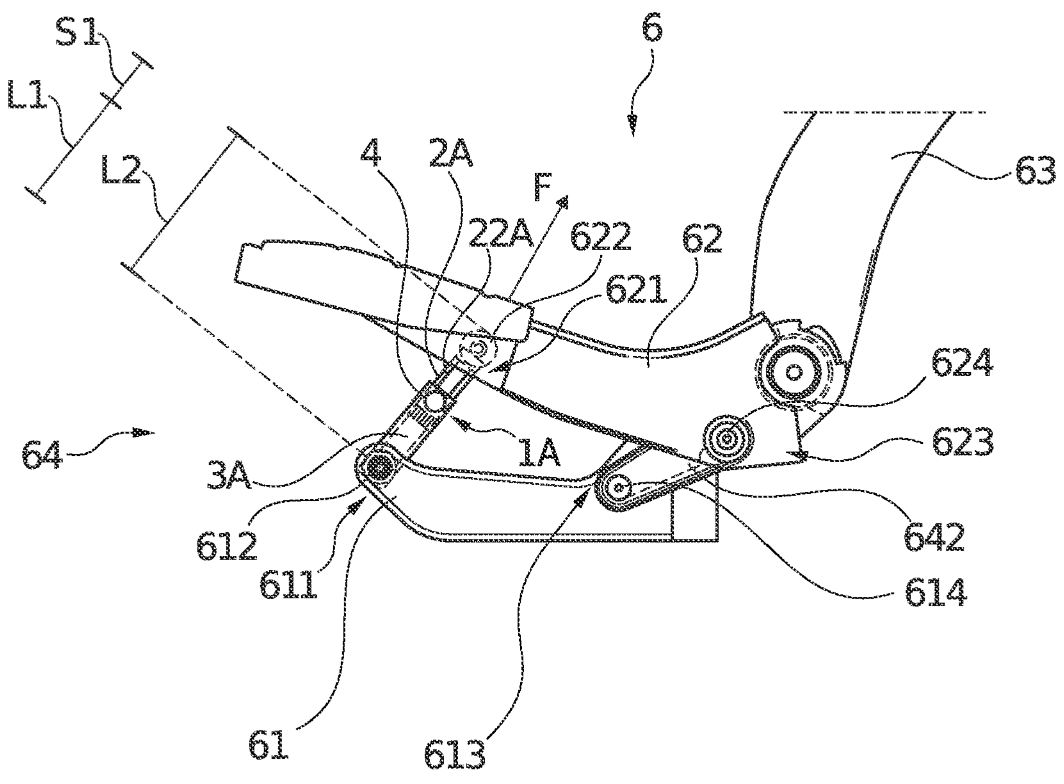
FIG. 11B shows a side view of the vehicle seat according to FIG. 11A with the lever in the released position.

FIGS. 11A and 11B show a vehicle seat 6 having a seat base 61 arranged on a vehicle floor, a seat part 62 and a backrest 63. The seat base 61 is connected to the seat part 62 via a seat height adjustment 64 of the vehicle seat 6. The seat part 62 can be moved relative to the seat base 61. The seat height adjustment 64 comprises at least one front height adjustment lever 1A and a rear height adjustment lever 642. The height adjustment levers 1A, 642 each have two bearing portions, with which the height adjustment levers are respectively connected to the seat part 62 and the seat base 61.

By way of example only, the height adjustment lever 1A shown corresponds to the embodiment of the proposed lever 1A shown in FIGS. 1A, 1B and 2. In principle, the vehicle seat 6 and the seat height adjustment 64 shown can also comprise any other embodiment of the proposed lever 1A.

The seat base 61 has a front bearing point 611 on a front side facing away from the backrest 63, which defines a front pivot axis 612. Thus, the front height adjustment lever 1A hinged to the front bearing point 611 is pivotable about the front pivot axis 612. Furthermore, in a rear region facing the backrest, the seat base 61 has a rear bearing point 613 that defines a rear pivot axis 614. Thus, the rear height adjustment lever 642 hinged to the rear pivot axis 614 is pivotally mounted about the rear pivot axis 614.

Similarly, the seat part 62 has a front bearing point 621 with a front pivot axis 622 on a front side facing away from the backrest 63 and a rear bearing point 623 with a rear pivot axis 624 on a rear side facing towards the backrest 63. In this case, the front lever 1A, which is mounted on the front bearing point 621 of the seat part 62, can be pivoted about the front pivot axis 622. Furthermore, the rear height adjustment lever 642 is pivotable about the rear pivot axis 624.

In the embodiment shown in FIG. 11A, the front height adjustment lever 1A corresponds to the lever 1A shown in FIGS. 1A and 1B in the initial position. The front bearing points 611, 622 have the first distance L1 corresponding to the initial position. Except for the mounting portion 11A, the movement element 2A is completely accommodated by the carrier element 3A, which is configured as a hollow body. Thus, in particular, the deformation portion 23A is completely inside the carrier element 3A. The displacement element 2A and the carrier element 3A are held together by the fastening part 4 as explained above. In this case, a relative displacement of the displacement element 2A to the carrier element 3A is blocked by the deformation portion 23A as long as the loads introduced into the front height adjustment lever 1A do not exceed the corresponding threshold value.

FIG. 11B shows the vehicle seat shown in FIG. 11A after a telescopic displacement of the displacement element 2A relative to the carrier element 3A by the application of tensile loads 11 exceeding the threshold value. The front height adjustment lever 1A is thus in the released position. Here, the front bearing points 611, 621 of the front height adjustment lever 1A have the second distance L2. Due to the changed distance of the front bearing points 611, 621, the seat part 62 is pivoted relative to the seat base 61.

The second distance L2 in the released position corresponds to the sum of the first distance L1 in the initial position plus the deformation path S1. Corresponding to the previous explanations regarding the lever 1A according to the embodiment shown in FIGS. 1A-2, the fastening part 4 is moved along the guide portion 22A up to the end stop (not shown), compared to the initial position shown in FIG. 11A. The deformation portion 23A is plastically deformed or destroyed by compression.

Figure 11C:
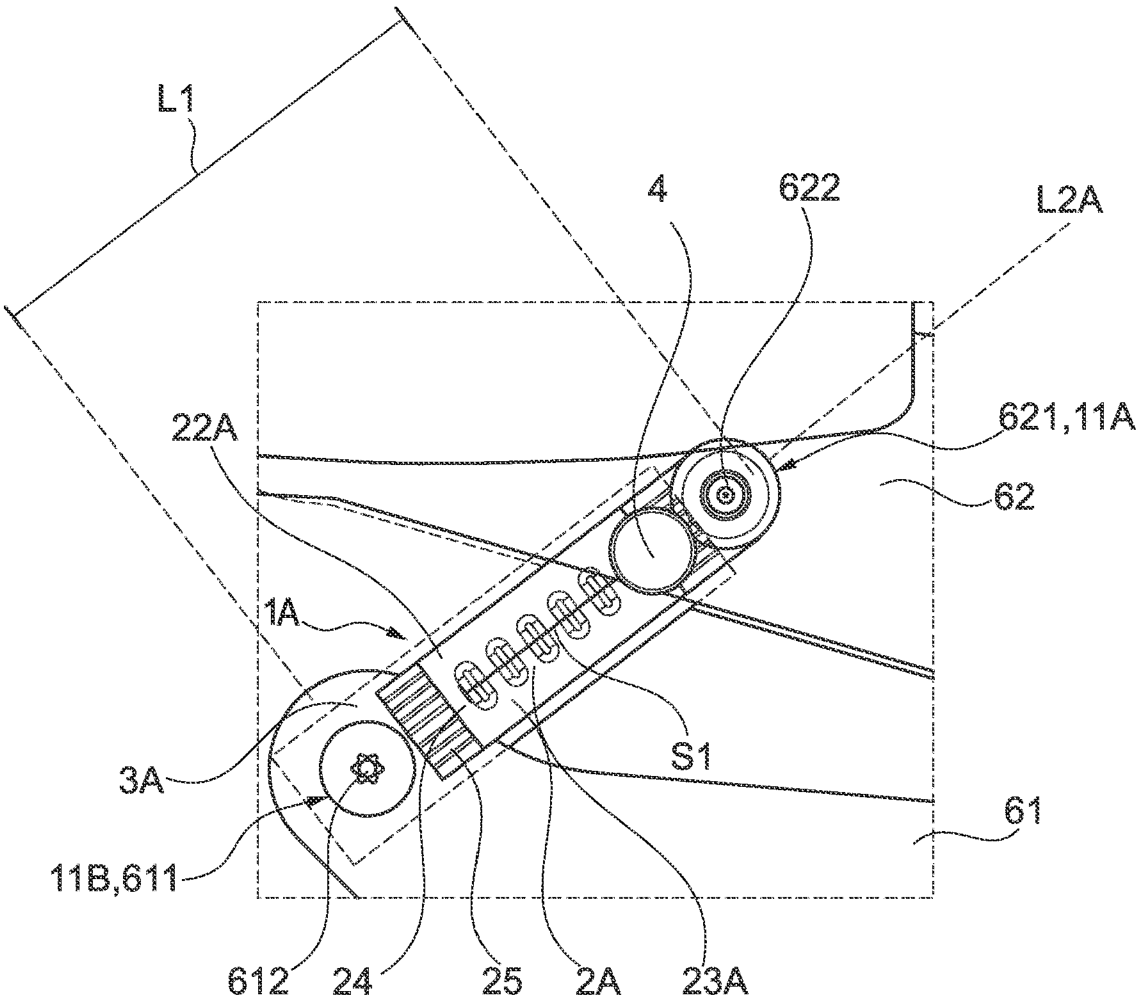
FIG. 11C shows a detailed view of the lever from FIG. 11A mounted on the vehicle seat.

FIG. 11C shows a detailed view of the front height adjustment lever 1A from FIG. 11A. The carrier element 3A encloses the interior 32, which is open towards both end portions of the carrier element 3A. In the area of one of the end portions of the carrier element 3A, the bearing point 11B for the pivotable bearing of the lever 1A is arranged on the front bearing point 611 of the seat base 61. For this purpose, a bearing pin engages through the opening of the bearing point 11B.

The bearing portion 11A of the displacement element 2A protrudes through the other of the two end portions of the carrier element 3A. The bearing portion 11A is hinged to the front bearing point 621 of the seat part 62—in this case by means of a bearing pin passing through the opening of the bearing point 11A. The bearing portions 11A, 11B have the first distance L1 between each other.

The deformation portion 23A extends in the guide portion 22A along the longitudinal extension axis L2A.

Thus, the fastening part 4 can be moved relative to the displacement element 2A by a tensile load introduced into the bearing portion 11A and exceeding a threshold value along the deformation path S1 with simultaneous deformation of the deformation portion 23A. The deformation portion 23A has a material thickness alternating along the deformation path S1, in this case by means of rib-shaped weakenings parallel to each other. This reduces the strength of the deformation portion 23A relative to the guide portion 22A and the bearing portion 11A.

The use of the proposed lever 1A-1I as a component of a vehicle seat 6 is not limited to the specific embodiment of the vehicle seat 6 shown. Furthermore, the lever 1A-1I may be applied as one of many levers 1A-1I, or as the only lever 1A-1I of an adjustment mechanism of the vehicle seat 6. In principle, a plurality of levers 1A-1I can also be part of a vehicle seat 6 according to the proposed solution.

LIST OF REFERENCE NUMERALS

1A-1I Lever
11A-11E Bearing portion
L1 Distance of the bearing portions in the initial position
L2 Distance of the bearing portions in the released position
S1-S5 Deformation path
2A-2E Displacement element
21A, 21B Opening
22A-22F Guide portion
23A-23F Deformation portion
231, 232 Web
24 End stop
25 Guide element
L2A, L2B Longitudinal extension axis
D2 Material thickness
3A-3F Carrier element
31A, 31B Opening
32 Interior
33 Slotted hole
34 Forming portion
4 Fastening part
5 Connecting element
51 Connecting portion
52 Guide portion
53 Deformation portion
54 End stop
6 Vehicle seat
61 Seat base
611 Front bearing point
612 Front pivot axis
613 Rear bearing point
614 Rear pivot axis
62 Seat part
621 Front bearing point
622 Front pivot axis
623 Rear bearing point
624 Rear pivot axis
63 Backrest
64 Seat height adjustment
1A Front lever
642 Rear lever
F Force

The invention claimed is:

1. Lever for a vehicle seat, comprising:
two bearing portions for pivotally connecting the lever to a further component in each case,
a carrier element, via which forces can be transmitted between the bearing portions,
a displacement element, on which one of the bearing portions is provided, and
an elongate guide portion formed on the displacement element, which is blocked in an initial position by a deformation portion so that the displacement element is fixed relative to the carrier element, wherein the deformation portion is deformable by the action of forces acting between the bearing portions such that the guide portion is released and the displacement element is displaceable relative to the carrier element.

2. The lever according to claim 1, wherein the carrier element is connected to the displacement element via a fastening part.

3. The lever according to claim 2, wherein the fastening part extends through an opening of the carrier element and/or an opening in the guide portion.

4. The lever according to claim 3, wherein the opening is formed in the guide portion in the form of a slotted guide.

5. The lever according to claim 4, wherein at least one of for fixing the displacement element relative to the carrier element, the opening in the guide portion is at least partially closed by the deformation portion in the initial position and the slotted guide is tapered along a deformation path.

6. The lever according to claim 1, further comprising a forming portion having a step that acts in a deforming manner on the deformation portion by the action of the forces acting between the bearing portions.

7. The lever according to claim 6, wherein the forming portion is formed on an inner side of the carrier element.

8. The lever according to claim 1, wherein as a result of a deformation of the deformation portion releasing the guide portion, the displacement element is displaceable relative to the carrier element along a deformation path predetermined by the guide portion, wherein the displacement element comprises a rigid end stop that limits the deformation path.

9. The lever according to claim 1, wherein a total length of at least one or the at least one deformation path corresponds to at least 1/10.

10. The lever according to claim 1, wherein the carrier element is configured as a hollow carrier with an interior, wherein the deformation portion is arranged in the initial position in the interior of the carrier element.

11. The lever according to claim 1, wherein the bearing portions are outside of the deformation portion.

12. The lever according to claim 1, wherein the carrier element comprises the other of the two bearing portions.

13. The lever according to claim 1, wherein the lever comprises a further displacement element on which the other of the two bearing portions is provided.

14. The lever according to claim 13, further comprising a further elongate guide portion, which is blocked in an initial position by a deformation portion so that the further displacement element is fixed relative to the carrier element, wherein the deformation portion can be deformed by the action of forces acting between the bearing portions such that the further guide portion is released and the further displacement element is displaceable relative to the carrier element.

15. The lever according to claim 14, wherein the deformation portion of the displacement element and the deformation portion of the further displacement element have different material properties.

16. A vehicle seat, comprising at least one lever according to claim 1, and the two components to which the bearing portions of the lever are pivotally connected.

17. The vehicle seat according to claim 16, wherein a seat part of the vehicle seat is mounted on a seat base of the vehicle seat via the at least one lever so as to be movable relative to the seat base.

18. The vehicle seat according to claim 17, wherein the vehicle seat has a seat height adjustment for adjusting a seat height of the seat part relative to the seat base, wherein the at least one lever is a component of the seat height adjustment.

19. The vehicle seat according to claim 18, wherein the at least one lever is a front lever of the seat height adjustment and the seat height adjustment further comprises a rear lever arranged, in comparison therewith, closer to a backrest of the vehicle seat, wherein the front lever is adjustable from the initial position to a released position in the event of an accident by tensile loads acting on the bearing portions.

* * * * *